United States Patent [19]
Haga et al.

[11] Patent Number: 5,611,754
[45] Date of Patent: Mar. 18, 1997

[54] CONTROL SYSTEM FOR INTERNAL COMBUSTION ENGINES

[75] Inventors: Takashi Haga; Hidezo Umiyama, both of Wako, Japan

[73] Assignee: Honda Giken Kogyo Kabushiki Kaisha, Tokyo, Japan

[21] Appl. No.: 467,872

[22] Filed: Jun. 6, 1995

[30] Foreign Application Priority Data

Oct. 26, 1994 [JP] Japan ................... 6-285816

[51] Int. Cl.$^6$ ........................................... F02D 43/00
[52] U.S. Cl. .................................................. 477/181
[58] Field of Search ............................................. 477/181

[56] References Cited

U.S. PATENT DOCUMENTS

| | | | |
|---|---|---|---|
| 4,484,497 | 11/1984 | Hibino | 477/181 |
| 5,141,089 | 8/1992 | Nobumoto et al. | 477/181 |
| 5,374,224 | 12/1994 | Huffmaster et al. | 477/181 |
| 5,385,517 | 1/1995 | Hara et al. | 477/181 |
| 5,498,217 | 3/1996 | Maruyama et al. | 477/181 |

FOREIGN PATENT DOCUMENTS 5-1614  1/1993  Japan.

*Primary Examiner*—Dirk Wright
*Attorney, Agent, or Firm*—Nikaido Marmelstein Murray & Oram LLP

[57] ABSTRACT

A control system for an internal combustion engine adjusts at least one predetermined control parameter such that a rate of combustion variation calculated based on a detected state of combustion of the engine becomes equal to a desired rate of combustion variation, which is dependent on operating conditions of the engine. A state of engagement of a lock-up clutch connected to the engine and a slip ratio of a torque converter connected to the same are detected. The desired rate of combustion variation is corrected in dependence on at least one of the detected state of engagement of the lock-up clutch and the detected slip ratio of the torque converter.

8 Claims, 13 Drawing Sheets

CONTROL SYSTEM FOR INTERNAL COMBUSTION ENGINES

BACKGROUND OF THE INVENTION

1. Field of the Invention

This invention relates to a control system for internal combustion engines, for calculating a rate of variation in combustion based on the state of combustion of the engine, and adjusting control parameters such that the calculated rate of variation in combustion becomes equal to desired values dependent upon operating conditions of the engine.

2. Prior Art

Conventionally, a control system of this kind has been proposed by Japanese Laid-Open Patent Publication (Kokai) No. 5-1614, which calculates a rate of variation in combustion based on the state of combustion of an internal combustion engine, and adjusts control parameters such that the calculated rate of variation in combustion becomes equal to desired values dependent upon operating conditions of the engine, to thereby meet two rather contradictory kinds of demand: improved drivability (reduction in sensed vehicle vibrations) and reduced fuel consumption and improved exhaust emission characteristics. According to the proposed control system, the shift position of a transmission connected to the engine is detected, and one of desired torque variation maps set in advance is selected according to the detected shift position to determine a desired torque variation from the selected map. The desired torque variation, which is thus corrected according to the shift position, is set to a rather low value at or in the vicinity of a vehicle speed resonance point.

Vibrations of the engine transmitted to the vehicle chassis (vibrations sensed by the driver) also vary in dependence on a degree of absorption of the vibrations by the driving system of the vehicle. The degree of absorption of the vibrations by the driving system depends not only on the shift position of the transmission but also on the state of engagement of a lock-up clutch provided in the transmission and a slip ratio of a torque converter also provided in the transmission. Therefore, the proposed control system cannot fully meet the two kinds of demand: improved drivability (reduction in sensed vehicle vibrations) and reduced fuel consumption and improved exhaust emission characteristics.

SUMMARY OF THE INVENTION

It is an object of the invention to provide a control system for an internal combustion engine, which is capable of meeting two kinds of demand, i.e. improved drivability (reduction in sensed vehicle vibrations), and reduced fuel consumption and improved exhaust emission characteristics, to a higher degree.

To attain the above object, according to a first aspect of the invention, there is provided a control system for an internal combustion engine to which are connected a lock-up clutch and a torque converter, including combustion state-detecting means for detecting a state of combustion of the engine, combustion variation rate-calculating means for calculating a rate of combustion variation, based on the state of combustion of the engine detected by the combustion state-detecting means, operating condition-detecting means for detecting operating conditions of the engine, and control parameter-adjusting means for adjusting at least one predetermined control parameter such that the rate of combustion variation calculated by the combustion variation rate-calculating means becomes equal to a desired rate of combustion variation dependent on the operating conditions of the engine detected by the operating condition-detecting means.

The control system according to the first aspect of the invention is characterized by comprising:

engagement state-detecting means for detecting a state of engagement of the lock-up clutch;

slip ratio-detecting means for detecting a slip ratio of the torque converter; and desired combustion variation rate-correcting means for correcting the desired rate of combustion variation in dependence on at least one of the state of engagement of the lock-up clutch detected by the engagement state-detecting means and the slip ratio of the torque converter detected by the slip ratio-detecting means.

Preferably, the desired combustion variation rate-correcting means corrects the desired rate of combustion variation to a smaller value as the state of engagement of the lock-up clutch is tighter.

More preferably, the desired combustion variation rate-correcting means corrects the desired rate of combustion variation to a larger value as the slip ratio of the torque is larger.

Preferably, the at least one predetermined control parameter comprises air-fuel ratio of a mixture supplied to the engine, and ignition timing of the engine.

To attain the above object, according to a second aspect of the invention, there is provided a control system for an internal combustion engine installed on an automotive vehicle, including combustion state-detecting means for detecting a state of combustion of the engine, combustion variation rate-calculating means for calculating a rate of combustion variation, based on the state of combustion of the engine detected by the combustion state-detecting means, operating condition-detecting means for detecting operating conditions of the engine, and control parameter-adjusting means for adjusting at least one predetermined control parameter such that the rate of combustion variation calculated by the combustion variation rate-calculating means becomes equal to a desired rate of combustion variation dependent on the operating conditions of the engine detected by the operating condition-detecting means.

The control system according to the second aspect of the invention is characterized by comprising:

driver's intention-detecting means for detecting a driver's intention;

traveling circumstantial condition-detecting means for detecting a traveling circumstantial condition of the vehicle; and desired combustion variation rate-correcting means for correcting the desired rate of combustion variation in dependence on at least one of the driver's intention detected by the driver's intention-detecting means and the traveling circumstantial condition of the vehicle detected by the traveling circumstantial condition-detecting means.

Preferably, the driver's intention-detecting means detects the driver's intention according to Fuzzy Inference.

More preferably, the driver's intention is detected in respect of intention of cruising, intention of acceleration, and intention of deceleration.

Further preferably, the desired combustion variation rate-correcting means corrects the desired rate of combustion variation to a smaller value as the intention of cruising is larger.

Further preferably, the desired combustion variation rate-correcting means corrects the desired rate of combustion variation to a larger value as the intention of acceleration is larger.

Further preferably, the desired combustion variation rate-correcting means corrects the desired rate of combustion variation to a smaller value as the intention of deceleration is larger.

Preferably, the traveling circumstantial condition-detecting means detects the traveling circumstantial condition of the vehicle by calculating traveling resistance of the vehicle.

To attain the above object, according to a third aspect of the invention, there is provided a control system for an internal combustion engine installed on an automotive vehicle, including combustion state-detecting means for detecting a state of combustion of the engine, combustion variation rate-calculating means for calculating a rate of combustion variation, based on the state of combustion of the engine detected by the combustion state-detecting means, operating condition-detecting means for detecting operating conditions of the engine, and control parameter-adjusting means for adjusting at least one predetermined control parameter such that the rate of combustion variation calculated by the combustion variation rate-calculating means becomes equal to a desired rate of combustion variation dependent on the operating conditions of the engine detected by the operating condition-detecting means.

The control system according to the third aspect of the invention is characterized by comprising:

sensed vibration parameter-detecting means for detecting a parameter indicative of vibration of the vehicle sensed by a driver of the vehicle; and desired combustion variation rate-correcting means for correcting the desired rate of combustion variation in dependence on the parameter detected by the sensed vibration parameter-detecting means.

Preferably, the sensed vibration parameter-detecting means comprises vehicle speed variation amount-detecting means for detecting an amount of variation in the speed of the vehicle.

Preferably, the sensed vibration parameter-detecting means comprises engine vibration amount-detecting means for detecting an amount of vibration of the engine.

More preferably, the desired combustion variation rate-correcting means corrects the desired rate of combustion variation to a smaller value as the variation in the speed of the vehicle is larger.

More preferably, the desired combustion variation rate-correcting means corrects the desired rate of combustion variation to a smaller value as the amount of vibration of the engine is larger.

The above and other objects, features, and advantages of the invention will become more apparent from the following detailed description taken in conjunction with the accompanying drawings.

BRIEF DESCRIPTION OF THE DRAWINGS

FIG. 8 to FIG. 8D show membership functions for determining the driver's intention of cruising, in which:

FIG. 8D shows a fourth membership function dependent on a parameter of a degree synthetically determined from degrees determined by the first to third membership functions;

FIG. 9A to FIG. 9C show first to third membership functions for determining the driver's intention of acceleration, in which:

FIG. 9A shows a first membership function dependent on a parameter of the vehicle speed;

FIG. 9B shows a second membership function dependent on a parameter of the throttle valve opening; and FIG. 9C shows a third membership function dependent on a parameter of a degree synthetically determined from degrees determined by the first and second membership functions;

FIG. 10A to FIG. 10C show membership functions for determining the driver's intention of acceleration, in which:

FIG. 10A shows a first membership function dependent on a parameter of ON/OFF operation of a brake switch;

FIG. 10B shows a second membership function dependent on a parameter of the acceleration; and FIG. 10C shows a third membership function dependent on a parameter of a degree synthetically determined from degrees determined by the first and second membership functions;

DETAILED DESCRIPTION

The invention will now be described in detail with reference to the drawings showing embodiments thereof.

Figure 1:
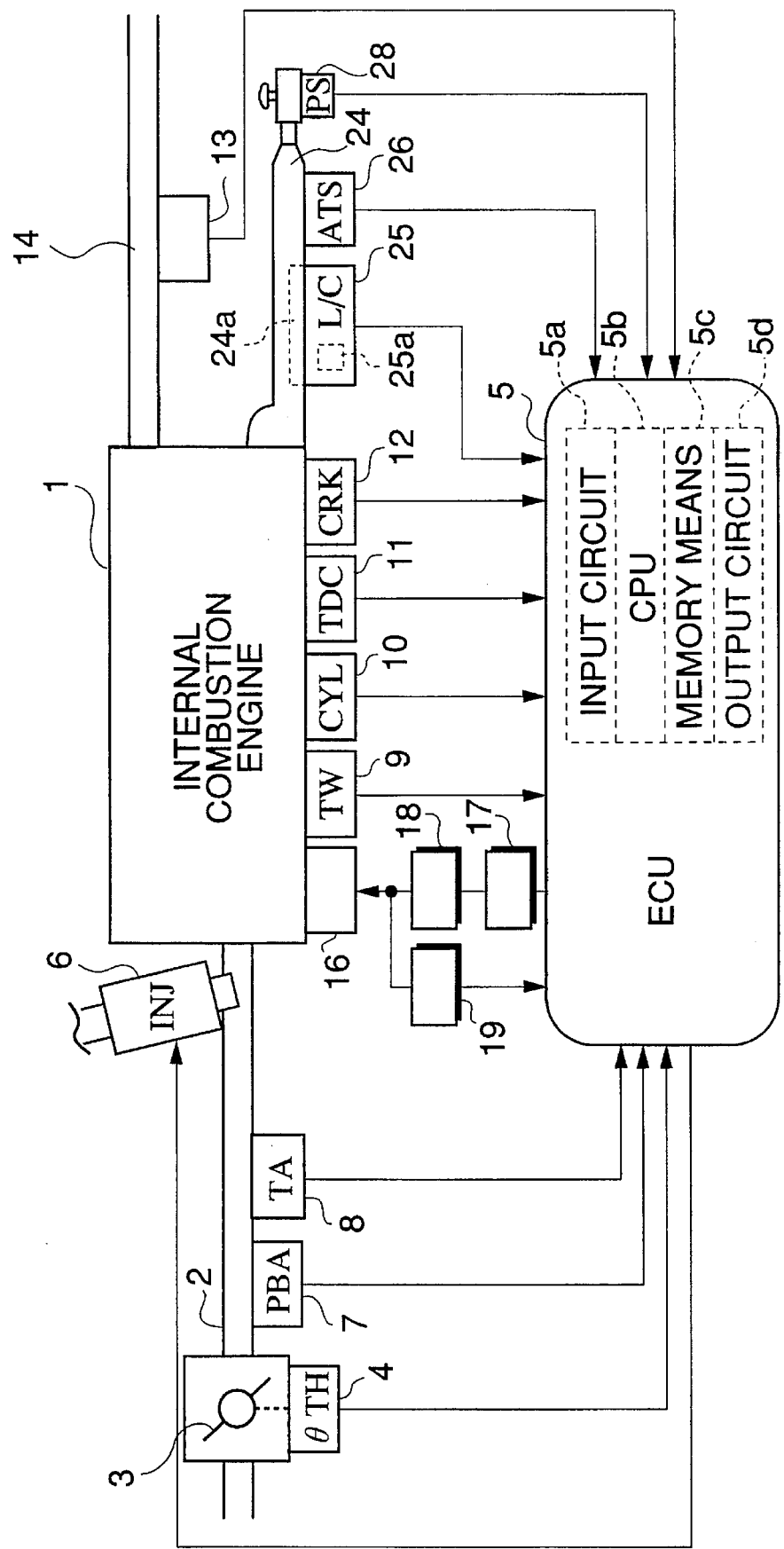
FIG. 1 is a diagram showing the arrangement of an internal combustion engine incorporating a control system therefor according to a first embodiment of the invention.

Referring first to FIG. 1, there is shown an internal combustion engine (hereinafter simply referred to as "the engine") incorporating a control system according to a first embodiment of the invention. Connected to the engine is a torque converter-type transmission 24 equipped with a lock-up device 25.

The engine 1 has an intake pipe 2 connected to a cylinder block thereof, in which is arranged a throttle valve 3. A throttle valve opening (θTH) sensor 4 is connected to the throttle valve 3 for generating an electric signal indicative of the sensed throttle valve opening θTH and supplying the same to an electric control unit (hereinafter referred to as "the ECU") 5.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their fuel injection periods (valve opening periods) controlled by signals therefrom.

A spark plug 16 provided for each cylinder of the engine 1 is electrically connected to the ECU 5 via a distributor 18 and a spark plug-driving circuit 17 to have ignition timing θIG controlled by a control signal therefrom. An ion current sensor 19 is connected to a line connecting between the distributor 18 and the spark plug 16, for detecting an ion current flowing between electrodes of the spark plug 16 during ignition, and supplying an electric signal indicative of the sensed ion current to the ECU 5.

Further, an intake pipe absolute pressure (PBA) sensor 7 is provided in communication with the interior of the intake pipe 2 via a conduit, not shown, opening into the intake pipe 2 at a location between the throttle valve 3 and the fuel injection valves 6, for supplying an electric signal indicative of the sensed absolute pressure PBA within the intake pipe 2 to the ECU 5. An intake air temperature (TA) sensor 8 is inserted into the intake pipe 2 at a location downstream of the conduit, for supplying an electric signal indicative of the sensed intake air temperature TA to the ECU 5.

An engine coolant temperature (TW) sensor 9 formed of a thermistor or the like is inserted into a coolant passage filled with a coolant and formed in the cylinder block, for supplying an electric signal indicative of the sensed engine coolant temperature TW to the ECU 5.

A cylinder-discriminating sensor (hereinafter referred to as "the CYL sensor") 10, a top dead center (TDC) sensor 11, and a crank angle (CRK) sensor 12 are arranged in facing relation to a camshaft or a crankshaft of the engine 1, neither of which is shown. The CYL sensor 10 generates a signal pulse (hereinafter referred to as "CYL signal pulse(s)") at a predetermined crank angle of a particular cylinder of the engine 1. The TDC sensor 11 generates a TDC signal pulse at predetermined crank angles (e.g. whenever the crankshaft rotates through 180 degrees if the engine is of the 4-cylinder type) which each correspond to a predetermined crank angle before a top dead center (TDC) of each cylinder corresponding to the start of the intake stroke of the cylinder. The CRK sensor 11 generates a pulse (hereinafter referred to as "CRK signal pulse(s)") at predetermined crank angles (e.g. whenever the crankshaft rotates through 30 degrees), i.e. at time intervals shorter than the repetition period of generation of TDC signal pulses. The CYL signal pulse, the TDC signal pulse, and the CRK signal pulse are supplied to the ECU 5. These signal pulses from the three sensors 10, 11, and 12 are used for control of various kinds of timing, such as fuel injection timing and ignition timing, as well as for detection of the engine rotational speed NE.

The engine 1 has an output shaft connected to the torque converter-type transmission 24 equipped with the lock-up (L/C) device 25. The lock-up device 25 has a lock-up clutch 25a, which carries out lock-up operation to establish and cancel direct coupling between input and output shafts of a torque converter 24a. The lock-up operation of the lock-up device 25 is controlled by the ECU 5.

The rotational speed of the output shaft of the torque converter is detected by a torque converter output shaft rotational speed sensor (ATS) 26 formed of a speedometer cable, and an electric signal indicative of the sensed rotational speed is supplied to the ECU 5. The ECU 5 detects a state of engagement of the lock-up clutch of the lock-up device 25 (hereinafter referred to as "the L/C engagement state") and a slip ratio of the torque converter, based on a ratio of the rotational speed NE2 of the output shaft of the torque converter calculated based on the electric signal from the torque converter output shaft rotational speed sensor (ATS) 26 to the rotational speed NE calculated based on TDC signal pulses from the TDC sensor 11.

The shift position of the transmission 24 is directly detected by a shift position sensor (PS) 28, and an electric signal indicative of the sensed shift position is delivered to the ECU 5.

The ECU 5 is comprised of an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM (read only memory) storing various operational programs which are executed by the CPU 5b, and various maps and tables, referred to hereinafter, and a RAM (random access memory) for storing results of calculations therefrom, etc., and an output circuit 5d which outputs driving signals to the fuel injection valves 6, the spark plugs 16, the lock-up device 25, etc.

The CPU 5b operates in response to the abovementioned signals from the sensors to determine operating conditions in which the engine 1 is operating, such as an air-fuel ratio feedback control region in which air-fuel ratio feedback control is carried out in response to oxygen concentration in exhaust gases detected by an oxygen concentration sensor 13 arranged in an exhaust pipe 14, and open-loop control regions, and calculates, based upon the determined engine operating conditions, a valve opening period or fuel injection period Tout over which the fuel injection valves 6 are to be opened, in synchronism with generation of TDC signal pulses, and ignition timing θIG of the spark plugs 16, by the use of the following equations (1) and 2:

$$Tout = TI \times KO2 \times K1 + K2 \quad (1)$$

$$\theta IG = \theta IGMAP - \theta IGCR \quad (2)$$

where TI and θIGMAP represent, respectively, a basic value of the fuel injection period Tout and a basic value of the ignition timing θIG which are read, respectively, from a TI map and a θIG map stored in the memory means 5c, according to the engine rotational speed NE and the intake pipe absolute pressure PBA.

KO2 represents an air-fuel ratio correction coefficient which is calculated based on the output signal from the oxygen concentration sensor 13 when the engine 1 is operating in the air-fuel ratio feedback control region, and set to predetermined values corresponding to the respective open-loop control regions of the engine 1 when the engine 1 is in the open-loop control regions.

K1, K2, and θIGCR represent other correction coefficients and correction variables, which are set according to engine operating parameter signals.

Further, the CPU 5b executes control of lock-up operation of the lock-up device 25 of the transmission 24 depending on operating conditions of the engine.

The CPU 5b delivers the aforementioned drive signals as results of the calculations and determinations mentioned above via the output circuit 5d to the fuel injection valves 6, the spark plugs 16, and the lock-up device 25.

Figure 2:
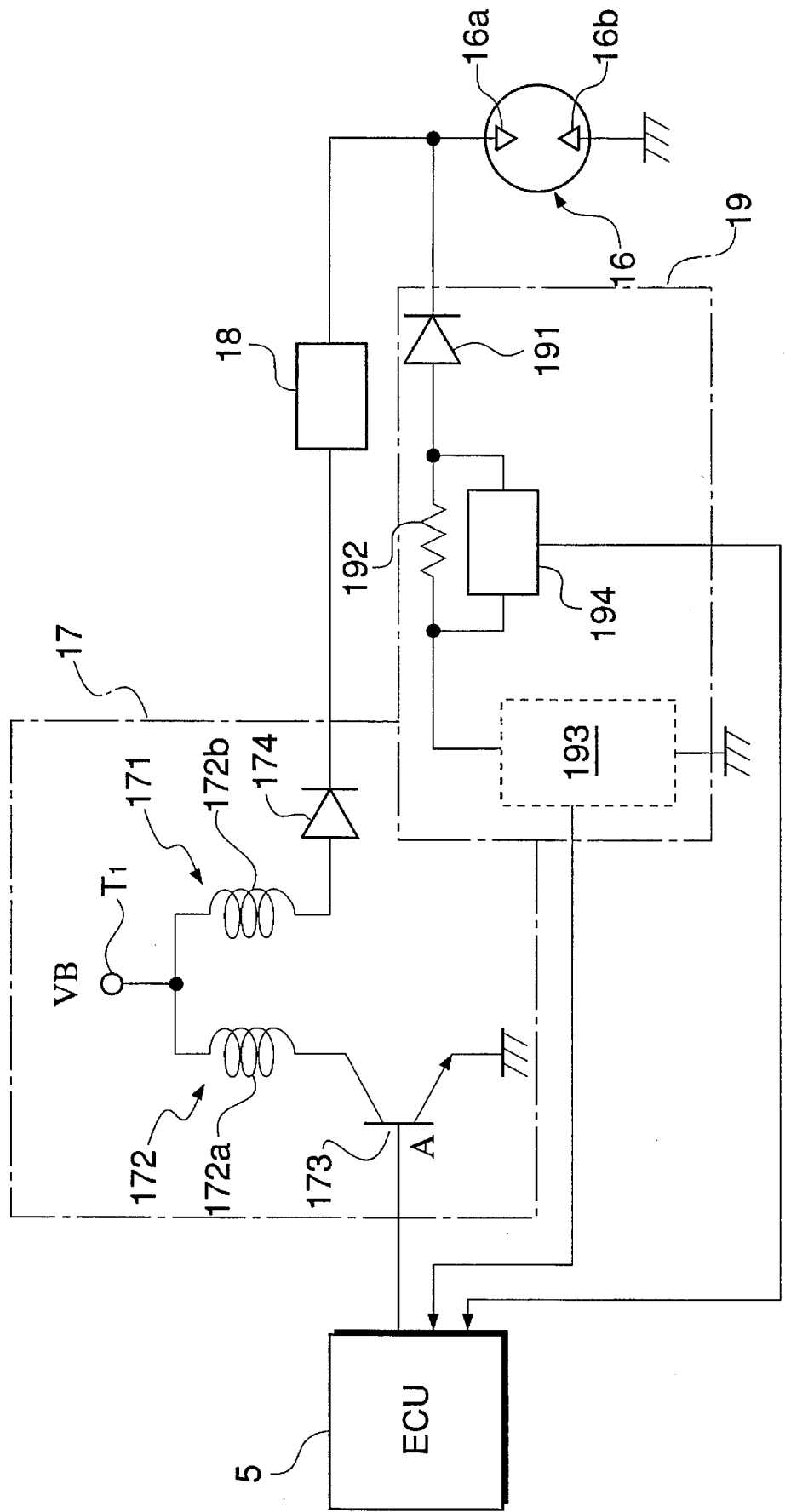
FIG. 2 is a circuit diagram showing the construction of a spark plug-driving circuit and an ion current sensor.

FIG. 2 shows circuit configurations of the spark plug-driving circuit 17 for driving the spark plug 16 and the ion current sensor 19.

In the figure, a power supply terminal T1 supplied with power supply voltage VB is connected to an ignition coil 172 comprised of a primary coil 172a and a secondary coil 172b. The primary coil 172a and the secondary coil 172b have respective one ends thereof connected to each other, and the other end of the primary coil 172a is connected to the collector of a transistor 173. The transistor 173 has its base connected to the ECU 5, and its emitter grounded. An ignition command signal A from the ECU 5 is applied to the base of the transistor 173. The secondary coil 172b has the other end thereof connected to a center electrode 16a of the spark plug 16 via a diode 174 and the aforementioned distributor 18, and a grounding electrode 16b of the spark plug 16 is grounded.

Further, the center electrode of the spark plug 16 is grounded via a diode 191, a resistance 192 and a power supply circuit 193, with a voltage sensor 194 being connected to opposite ends of the resistance 192 for measuring a potential difference (i.e. voltage) between the opposite ends of the resistance 192. The power supply circuit 193 is connected to the ECU 5, to be controlled thereby to apply a predetermined voltage to the center electrode 16a of the spark plug 16 at time points corresponding to and close to ignition timing set for each operating cycle of the engine. The diode 191, the power supply circuit 193, the resistance 192, and the voltage sensor 194 cooperate to form the ion current sensor 19 for detecting an amount of ion current flowing between the electrodes 16a, 16b of the spark plug 16, and an electric signal indicative of the sensed ion current amount is delivered to the ECU 5.

When the spark plug 16 ignites a mixture within the combustion chamber of the engine in response to the ignition command signal A from the ECU 5, the mixture is ionized to a sufficient degree if the state of the combustion is normal, whereupon a large amount of ion current, supplied from the power supply circuit 193, flows between the center electrode 16a of the spark plug 16 and the grounding electrode 16b of the same so that the voltage across the opposite ends of the resistance 192 detected by the voltage sensor 194 increases. On the other hand, if the state of combustion is abnormal due to a misfire or the like, the mixture cannot be fully ionized, so that a small amount of ion current flows between the center electrode 16a and the grounding electrode 16b, resulting in a low voltage detected by the voltage sensor 194. The detection of the voltage by the voltage sensor 194 is carried out a plurality of times at timing corresponding to a plurality of crank angles at and in the vicinity of the ignition timing of each operating cycle. In this way, the amount of ion current varying with the state of combustion of the mixture is detected in each operating cycle. A parameter X indicative of the state of combustion is calculated based on the detected ion current. A Pmi variation rate representative of the actual combustion variation rate, which is defined as an average rate of variation in effective pressure within the cylinder, is calculated from a variation in the parameter X. In this connection, it has been experimentally ascertained that there is a good correlation between the parameter x indicative of the state of combustion and the Pmi variation rate. Details of a manner of calculation of the parameter X indicative of the state of combustion based on the ion current are disclosed by Japanese Patent Application No. 6-120627 filed by the present assignee, and hereby incorporated by reference into the present specification. The disclosed calculation manner may be applied in the present embodiment.

Figure 3:
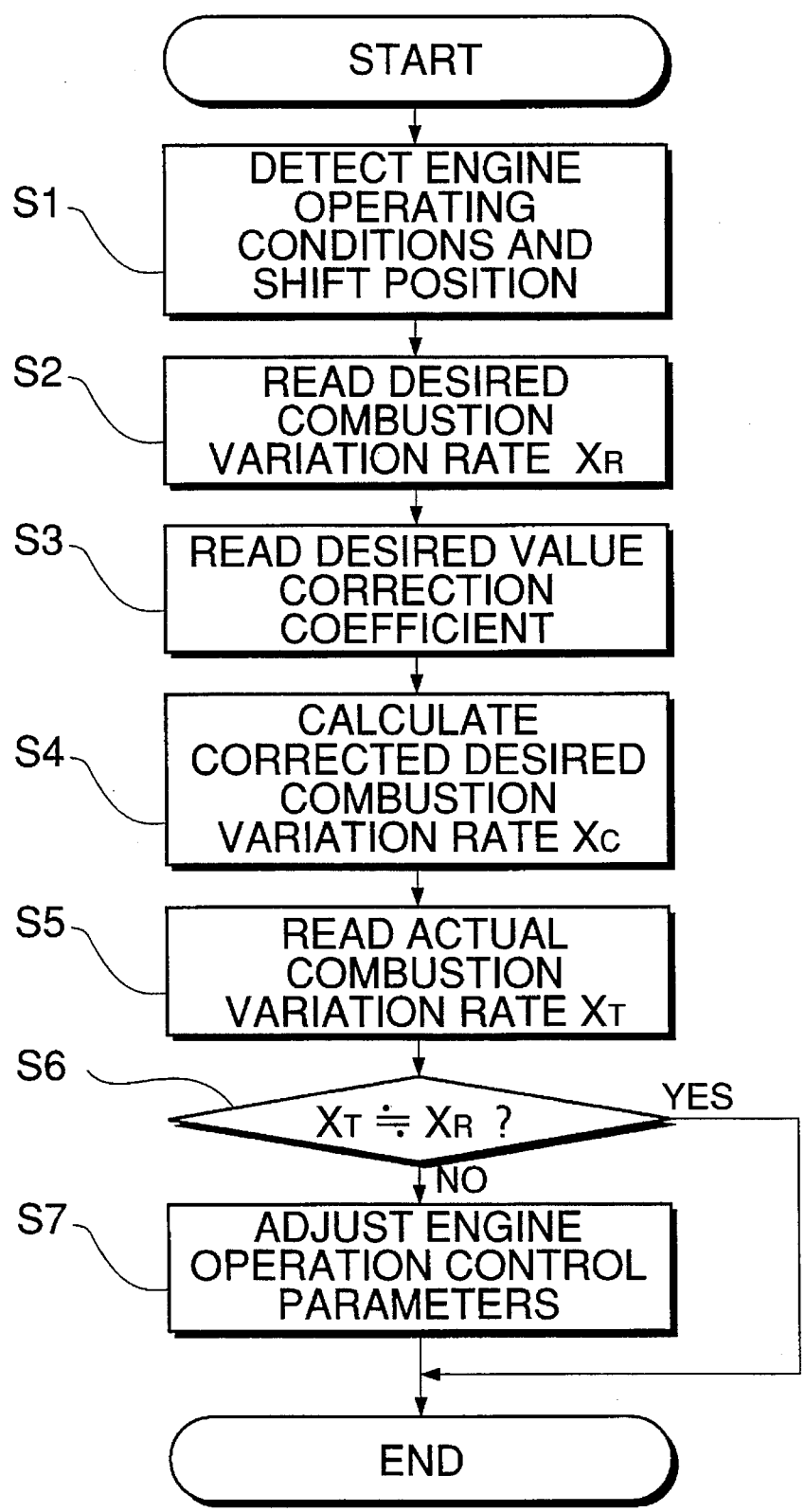
FIG. 3 is a flowchart showing a program for correcting a desired combustion variation rate and for controlling engine operation control parameters (air-fuel ratio A/F and ignition timing ($\theta$IG)), based on the corrected desired combustion variation rate.

Next, description will be made of manners of correcting a desired combustion variation rate, and controlling the engine operation control parameters (air-fuel ratio A/F and ignition timing θIG) in response to the corrected desired combustion variation rate, with reference to FIG. 3.

First, at a step S1, the operating condition of the engine and the shift position of the transmission 24 are detected. The engine operating condition is determined based on the engine rotational speed NE, the throttle valve opening θTH, etc.

Next, at a step S2, the desired combustion variation rate XR, i.e. a desired value of the Pmi variation rate is read from a map stored in the memory means 5c according to the detected engine operating condition and the detected shift position of the transmission 24.

Then, at a step S3, a desired rate correction coefficient KTOTAL is read in, which is calculated by a routine, described hereinafter. Then, a corrected desired combustion variation rate XC is calculated by multiplying the desired combustion variation rate XR by the desired rate correction coefficient KTOTAL by the use of the following equation (3):

$$XC = XR \times KTOTAL \qquad (3)$$

At a step S5, the actual combustion variation rate XT is read in, which is calculated by a routine, described hereinafter. It is then determined at a step S6 whether or not the actual combustion variation rate XT is substantially equal to the corrected desired combustion variation rate XC.

If the condition that the actual variation combustion rate XT is substantially equal to the corrected desired combustion variation rate XC is fulfilled, the present processing is immediately terminated. If the condition is not fulfilled, the engine operation control parameters are adjusted at a step S7 such that the actual combustion variation rate XT becomes equal to the corrected desired combustion variation rate XC. More specifically, the air-fuel ratio A/F and the ignition timing θIG, as the control parameters, are adjusted such that the actual combustion rate variation XT becomes equal to the corrected desired combustion variation rate XC.

Figure 4:
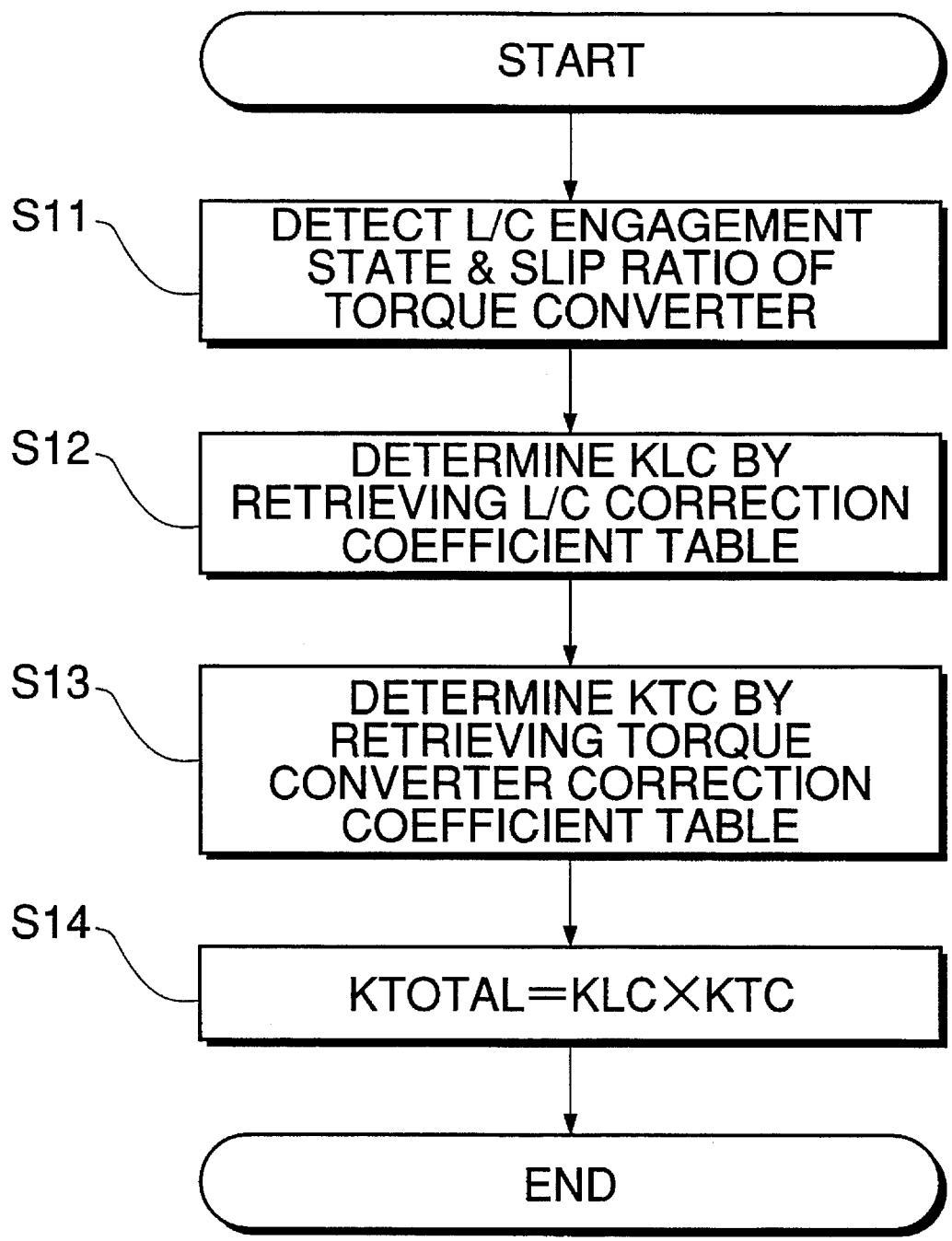
FIG. 4 is a flowchart showing a program for calculating a desired rate correction coefficient.

Next, a manner of calculation of the desired rate correction coefficient will be described with reference to FIG. 4 showing the routine for calculating the desired rate correction coefficient.

First, at a step S11, the L/C engagement state and the slip ratio of the torque converter are detected based on a ratio of the rotational speed of the input shaft of the torque converter determined from the engine rotational speed NE to that of the output shaft of the same detected by the torque converter output shaft rotational speed sensor (ATS) 26.

Then, a correction coefficient KLC dependent on the L/C engagement state is determined by retrieving a L/C correction coefficient table stored in the memory means 5c, at a step S12, and a correction coefficient KTC dependent on the slip ratio of the torque converter is determined by retrieving a torque converter correction coefficient table stored in the memory means 5c, at a step S13.

Figure 6:
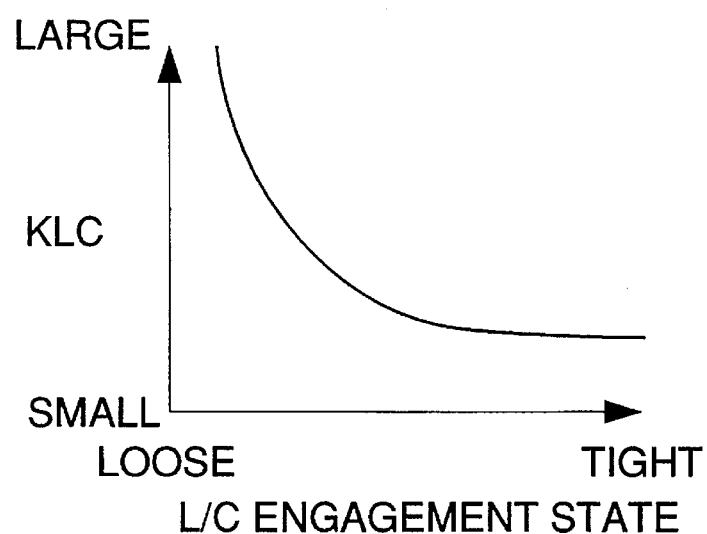
FIG. 6 shows an L/C correction coefficient table.
Figure 7:
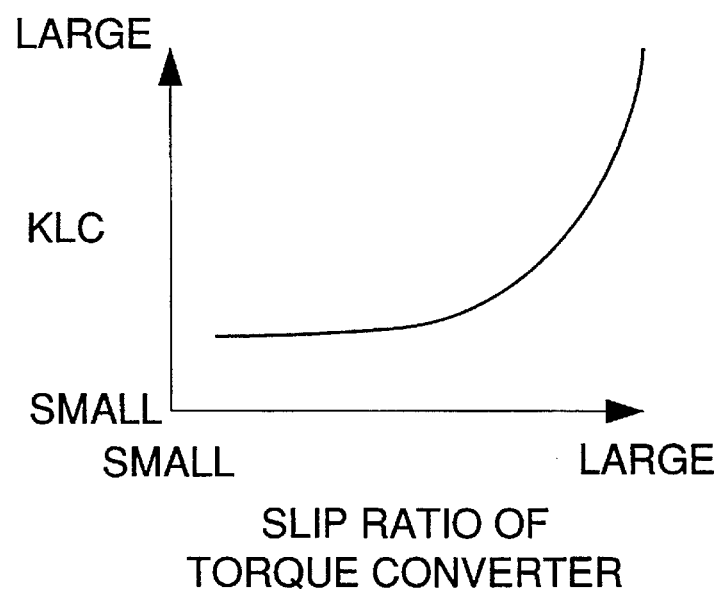
FIG. 7 shows a torque converter correction coefficient table.

The L/C correction coefficient table and the torque converter correction coefficient table are shown in FIG. 6 and FIG. 7, respectively. As shown in FIG. 6, the L/C correction coefficient table is set such that as the L/C engagement state changes from a looser side to a tighter side, the correction coefficient KLC decreases along a parabolic curve. On the other hand, as shown in FIG. 7, the torque converter correction coefficient table is set such that as the slip ratio of the torque converter increases, the correction coefficient KLC increases along a parabolic curve.

The desired rate correction coefficient KTOTAL is calculated based on the correction coefficients KLC and KTC by the use of the following equation (4) at a step S14, followed by terminating the program:

$$KTOTAL=KLC\times KTC \qquad (4)$$

Figure 5:
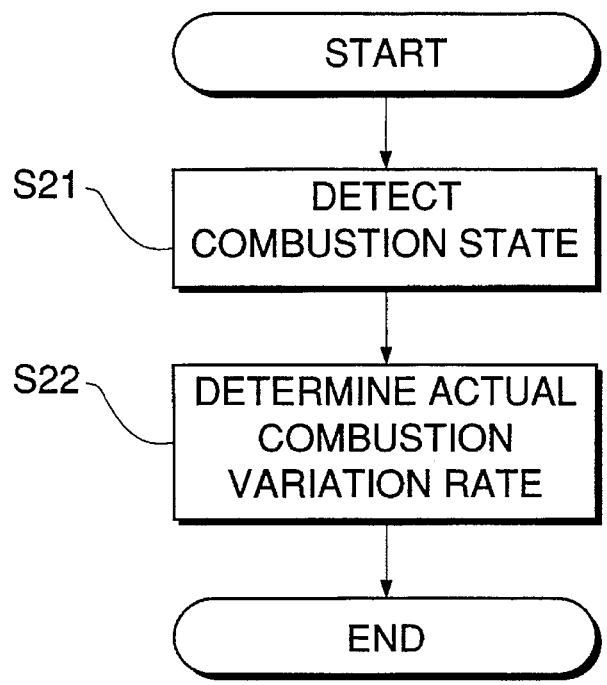
FIG. 5 is a flowchart showing a program for calculating an actual combustion variation rate.

Next, a manner of calculation of the actual combustion variation rate XT will be described with reference to FIG. 5 showing the routine for calculating the actual combustion variation rate XT.

First, at a step S21, the amount of the ion current, which varies with the state of combustion of the mixture, is detected through the output from the voltage sensor 194 in each cycle of the engine operation, and the parameter X indicative of the state of combustion is calculated based on the detected ion current amount by the use of the following equation:

$$X=IC(\theta 2)-\theta 1\times K \qquad (5)$$

where $\theta 1$ represents a crank angle at which the ion current IC becomes equal to a predetermined value ICSL during the first half of each combustion cycle (at TDC, $\theta 1=0$, and if $\theta 1<0$, $\theta 1$ is regarded as equal to 0), and $\theta 2$ represents a predetermined crank angle assumed during the second half of each combustion cycle. $IC(\theta 2)$ represents a value of the ion current detected at the predetermined crank angle $\theta 2$, and K represents a weighting coefficient experimentally determined according to operating conditions of the engine, e.g. the engine rotational speed NE and the intake pipe absolute pressure PBA.

Then, the Pmi variation rate indicative of the actual combustion variation rate XT is calculated from a variation in the parameter X at a step S22.

Next, the above control operation will be described with reference to specific examples.

If the engine rotational speed NE is low and at the same time the shift position is a fourth-speed position, that is, if the vehicle is traveling at a constant speed, the desired combustion variation rate XR, i.e. a desired value of the Pmi variation rate is set to 7.5%, and the air-fuel ratio is set to 24.

Under this operating condition, if the L/C engagement state detected is tight, and the slip ratio of the torque converter detected is small, the correction coefficients KLC and KTC are set to 0.9and 0.9, respectively, by retrieving the respective correction coefficient tables. The desired rate correction coefficient table KTOTAL is calculated to 0.81 from the correction coefficients KLC, KTC.

The desired combustion variation rate XR is corrected by the desired rate correction coefficient KTOTAL to the corrected desired combustion variation rate XC, which in the present case is equal to approximately 6.1%.

Then, the air-fuel ratio A/F and the ignition timing $\theta IG$ are controlled such that the actual combustion variation rate XT becomes equal to the corrected desired combustion variation rate XC, i.e. 6.1%. Through the correction of the desired combustion variation rate from 7.5% to 6.1%, the air-fuel ratio A/F is changed in an enriching direction from 24 to 22, and at the same time the ignition timing $\theta IG$ is corrected in a retarding direction.

In contrast, when the engine is being accelerated, and at the same time the shift position is in a second-speed position, that is, if the engine is in an accelerating state, the desired combustion variation rate XR, i.e. the desired value of the Pmi variation rate is set to 10%, and the air-fuel ratio A/F is set to 13.5.

Under this operating condition, if the L/C engagement state detected is loose, and the slip ratio of the torque converter detected is large, the correction coefficients KLC and KTC are set to 1.2 and 1.1, respectively, by retrieving the respective correction coefficient tables. The desired rate correction coefficient table KTOTAL is calculated to 1.32 from the correction coefficients KLC, KTC The desired combustion variation rate XR is corrected by the desired rate correction coefficient KTOTAL to the corrected desired combustion variation rate XC, which in the present case is equal to 13.2%.

Then, the air-fuel ratio A/F and the ignition timing $\theta IG$ are controlled such that the actual combustion variation rate XT becomes equal to the corrected desired combustion variation rate XC, i.e. 13.2%. Through the correction of the desired combustion variation rate from 10% to 13.2%, the air-fuel ratio A/F is changed in a leaning direction, i.e. 13.5 to 14.7, and at the same time the ignition timing $\theta IG$ is corrected in an advancing direction.

As described above, the desired combustion variation rate set based on operating conditions of the engine and the shift position is corrected depending on the state of engagement of the lock-up device 25 and the slip ratio of the torque converter. Therefore, it is possible to achieve very fine control of the combustion state, so as to make it possible to realize a lean-limit operation of the engine in which the air-fuel ratio is controlled to the leanest possible value insofar as the engine vibration is suppressed to such a sufficient degree as does not adversely affect the sense of the driver. As a result, higher driveability of the engine (reduction in sensed vehicle vibrations) can be achieved while meeting the demands for reduced fuel consumption and improved exhaust emission characteristics to more satisfactory degrees.

Next, a second embodiment of the invention will be described with reference to FIG. 8 to FIG. 15.

The arrangement of a control system according to the present embodiment and an internal combustion engine incorporating the same is substantially identical to the arrangement of the first embodiment described above, and therefore detailed description thereof is omitted.

According to the present embodiment, the driver's intention and the traveling circumstantial condition (represented by the traveling resistance) are detected, and the desired rate correction coefficient is calculated from the detected driver's intention and traveling circumstantial condition. The desired combustion variation rate set based on operating conditions of the engine and the shift position is corrected based on the desired rate correction coefficient calculated, and the engine operation control parameters (the air-fuel ratio A/F and the ignition timing $\theta IG$) are controlled such that the actual combustion variation rate becomes equal to the corrected desired combustion variation rate. In short, the present embodiment is distinguished from the first embodiment in the manner of calculation of the desired rate correction coefficient.

The driver's intention is determined according to Fuzzy Inference by the use of membership functions as means for digitizing data of language expressions. In the present embodiment, inference or reasoning is carried out to determine a category of the driver's intention from among the intention of cruising, the intention of acceleration, and the intention of deceleration. Membership functions for the intention of cruising, the intention of acceleration, and the intention of deceleration are set in the form of respective tables stored in the memory means 5c in advance.

Next, a manner of reasoning of the driver's intention will be described with reference to FIG. 8 to FIG. 10. FIG. 8 shows membership functions for determining the intention of cruising, FIG. 9 membership functions for determining the intention of acceleration, and FIG. 10 shows membership functions for determining the intention of deceleration.

Figure 8A:
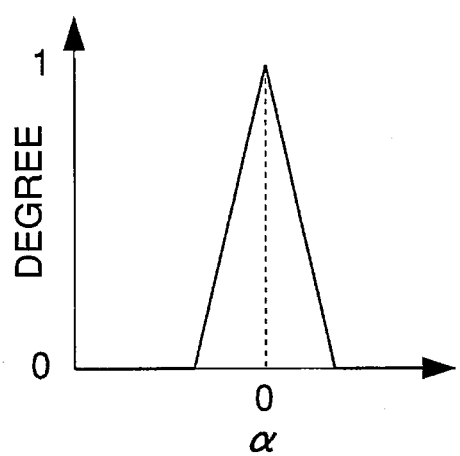
FIG. 8A shows a first membership function dependent on a parameter of acceleration.
Figure 8B:
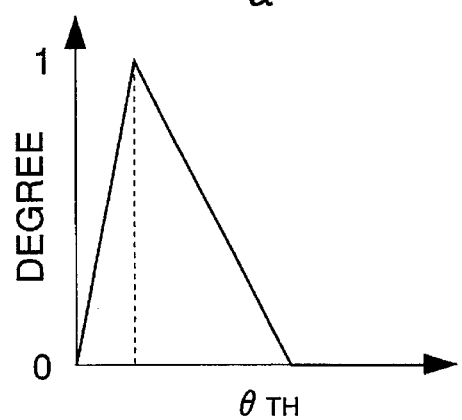
FIG. 8B shows a second membership function dependent on a parameter of throttle valve opening.
Figure 8C:
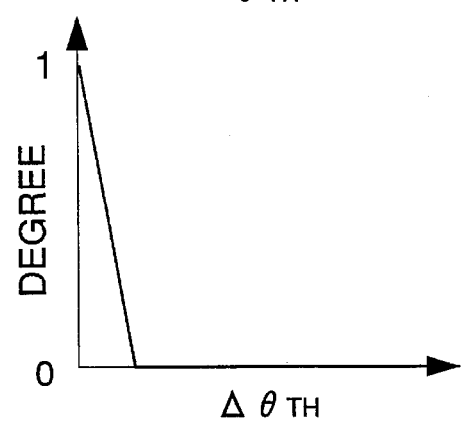
FIG. 8C shows a third membership function dependent on a parameter of a rate of change in the throttle valve opening.
Figure 8D:
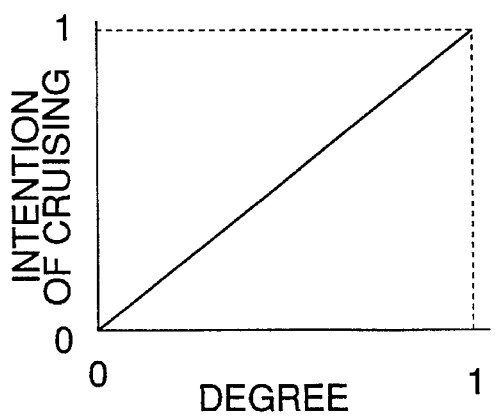

The driver's intention of cruising is determined by the use of four membership functions as shown in FIG. 8A to FIG. 8D. FIG. 8A shows a first membership function which represents a degree of the intention of cruising determined dependent on a parameter of acceleration $\alpha$. FIG. 8B shows a second membership function which represents a degree of the intention of cruising dependent on a parameter of throttle valve opening $\theta TH$. FIG. 8C shows a third membership function which represents a degree of the intention of cruising dependent on a parameter of a rate $\Delta\theta TH$ of variation in the throttle valve opening $\theta TH$. FIG. 8D shows a fourth membership function which represents a degree of the intention of cruising dependent on a degree synthetically determined from the degrees determined by the first to third membership functions. As the degree of the fourth membership function may be used the minimum degree of the degrees determined by the first to third membership functions, or alternatively the product of these degrees.

Figure 9A:
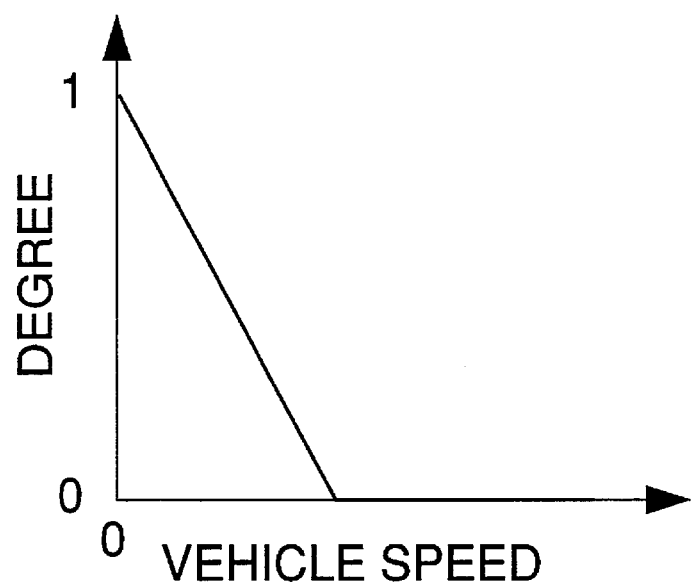
Figure 9B:
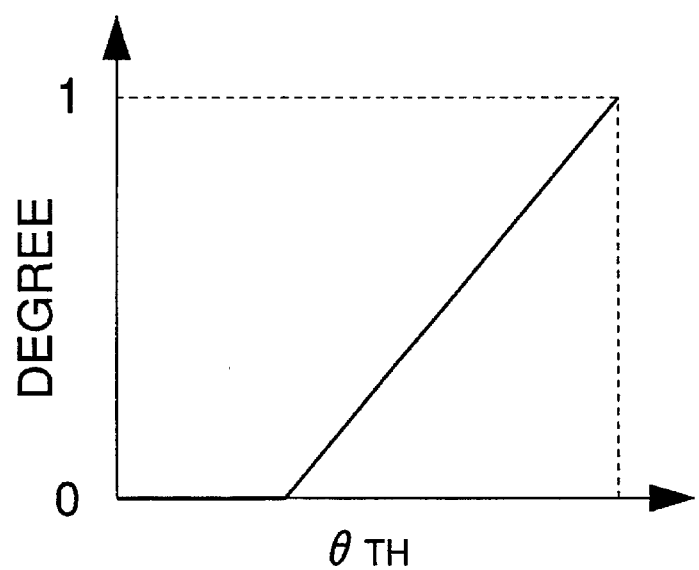
Figure 9C:
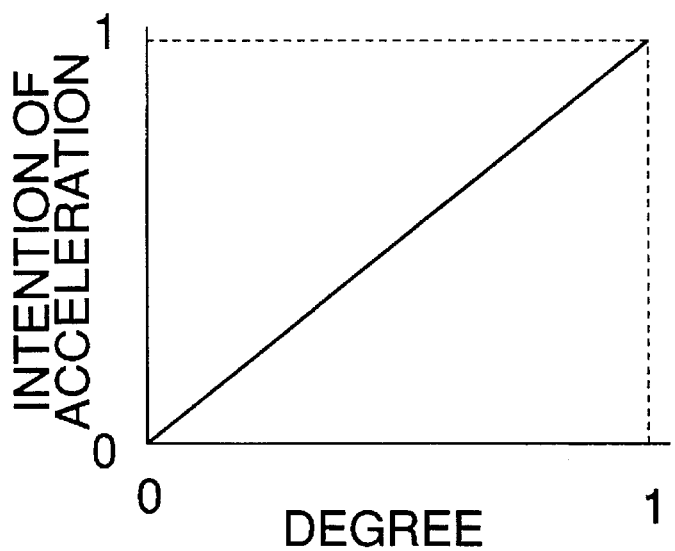

The driver's intention of acceleration is determined by the use of three membership functions as shown in FIG. 9A to FIG. 9C. FIG. 9A shows a first membership function which represents a degree of the intention of acceleration dependent on a parameter of the vehicle speed. FIG. 9B shows a second membership function which represents a degree of the intention of acceleration dependent on a parameter of the throttle valve opening $\theta TH$. FIG. 9C shows a third membership function which represents a degree of the intention of acceleration dependent on a degree synthetically determined from the degrees determined by the first and second membership functions. The degree of the third membership function may be determined in the same manner as described hereinabove for determination of the intention of cruising.

Figure 10A:
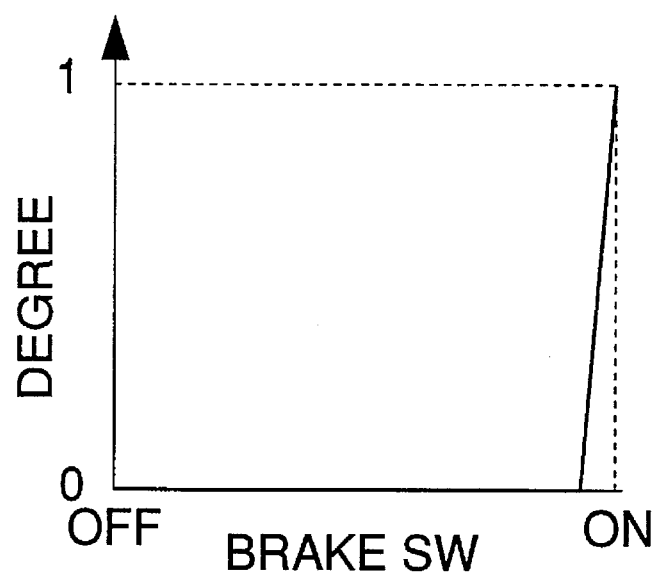
Figure 10B:
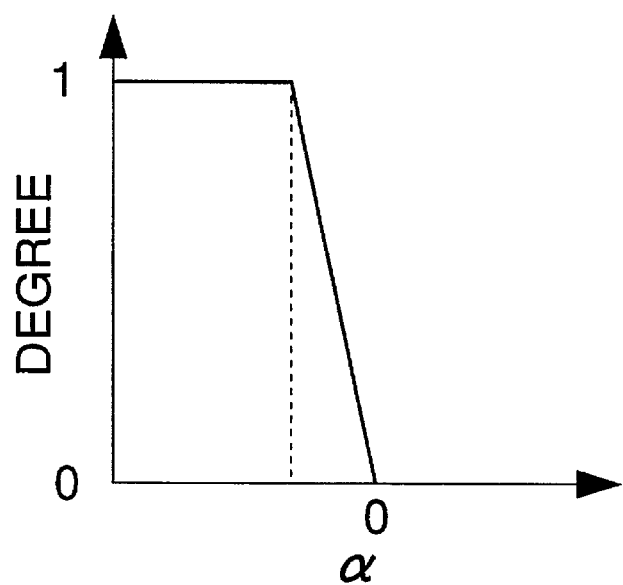
Figure 10C:
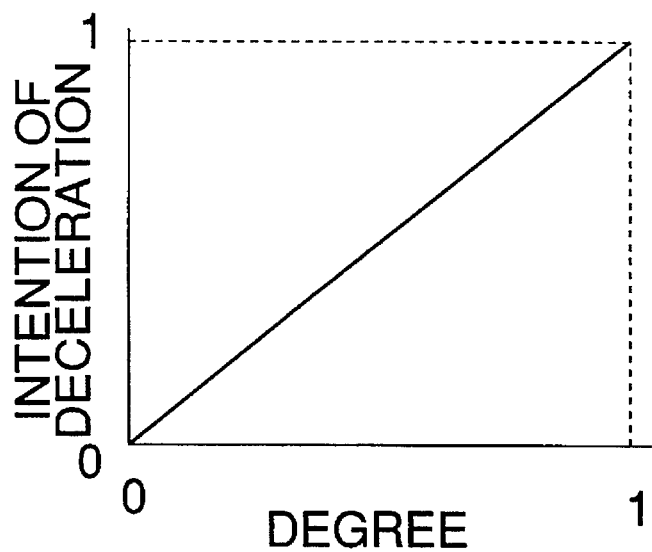

The driver's intention of deceleration is determined by the use of three membership functions as shown in FIG. 10A to FIG. 10C. FIG. 10A shows a first membership function which represents a degree of the intention of deceleration dependent on a parameter of ON/OFF operation of a brake switch (brake SW). FIG. 10B shows a second membership function which represents a degree of the intention of deceleration dependent on a parameter of acceleration $\alpha$. FIG. 10C shows a third membership function which represents a degree of the intention of deceleration dependent on a degree synthetically determined from the degrees determined by the first and second membership functions. The degree of the third membership function is determined in the same manner as described hereinabove for determination of the intention of cruising.

From the degrees of the intention of cruising, the intention of acceleration, and the intention of deceleration determined as above, estimation is made of the category of the driver's intention.

For example, if the acceleration $\alpha$ is equal to 0, the throttle valve opening $\theta TH$ is equal to a value assumed during cruising, and at the same time the throttle valve opening variation rate $\Delta\theta TH$ is equal to 0, the degrees of the first to third membership functions for the intention of cruising each assume a value close to 1, so that the degree of the intention of cruising determined from the fourth membership function is close to 1, whereby it is assumed that the driver has a strong intention of cruising.

In contrast, if the vehicle speed is low, and the throttle valve opening $\theta TH$ is large, the degrees of the first and second membership functions for the intention of acceleration each assume a value close to 1, so that the degree of the intention of acceleration determined from the third membership function is close to 1, whereby it is assumed that the driver has a strong intention of acceleration.

Further, if the brake SW is ON, and at the same time the acceleration $\alpha$ increases in a decelerating direction, the degrees of the first and second membership functions for the intention of deceleration each assume a value close to 1, so that the degree of the intention of deceleration determined from the third membership function is close to 1, whereby it is assumed that the driver has a strong intention of deceleration.

Next, a manner of detecting the traveling circumstantial condition will be described.

In the present embodiment, the traveling circumstantial condition is determined by calculating the traveling resistance of the vehicle (hereinafter referred to as "the traveling resistance"). The traveling resistance is calculated by the following equation (6):

$$\text{Traveling Resistance} = (\text{Engine Torque} \times \text{Transmission Efficiency} \times \text{Total Reduction Ratio})/(\text{Effective Radius of Tires}) - \{\text{Weight} \times (1+\text{Equivalent Inertia Weight})\} \times \text{Acceleration of Vehicle Chassis} \quad (6)$$

For example, the traveling resistance is large when the vehicle is running up on an ascending slope, and small when the vehicle is running down on a descending slope.

Figure 11:
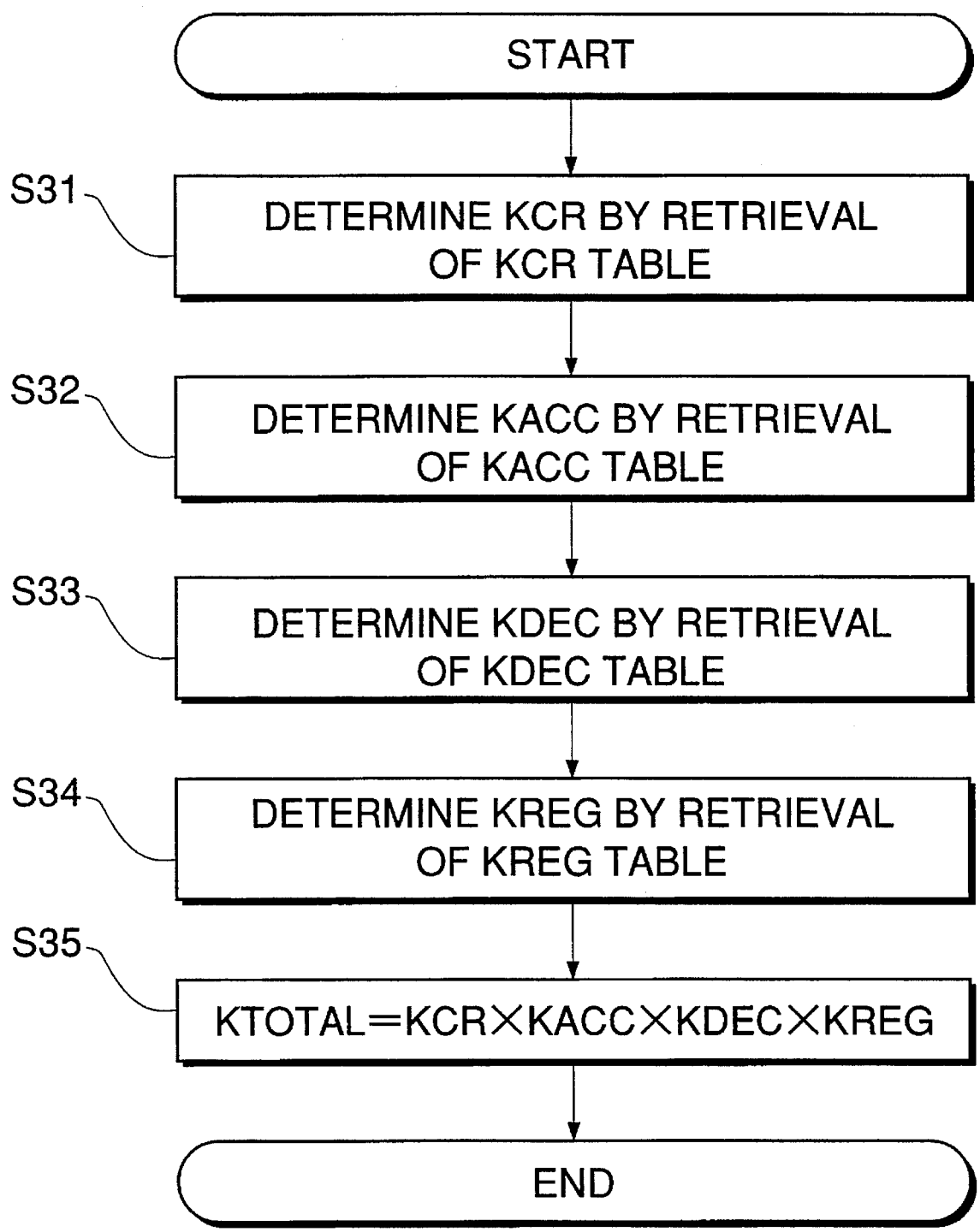
FIG. 11 is a flowchart showing a program for calculating the desired rate correction coefficient, which is executed by a control system according to a second embodiment of the invention.

Next, a manner of calculation of the desired rate correction coefficient according to the present embodiment will be described with reference to FIG. 11 showing a routine for calculating the desired rate correction coefficient.

First, at a step S31, the estimated value indicative of the degree of the driver's intention of cruising is read in, and a cruising intention-dependent correction coefficient KCR is calculated by retrieving a KCR table stored in the memory means 5c according to the estimated value indicative of the degree of the driver's intention of cruising.

Then, at a step S32, the estimated value indicative of the degree of the driver's intention of acceleration is read in, and an accelerating intention-dependent correction coefficient KACC is calculated by retrieving a KACC table stored in the memory means 5c according to the estimated value indicative of the degree of the driver's intention of acceleration.

Next, at a step S33, the estimated value indicative of the degree of the driver's intention of deceleration read in, and a decelerating intention-dependent correction coefficient KDEC is calculated by retrieving a KDEC table stored in the memory means 5c according to the estimated value indicative of the degree of the driver's intention of deceleration.

Figure 12:
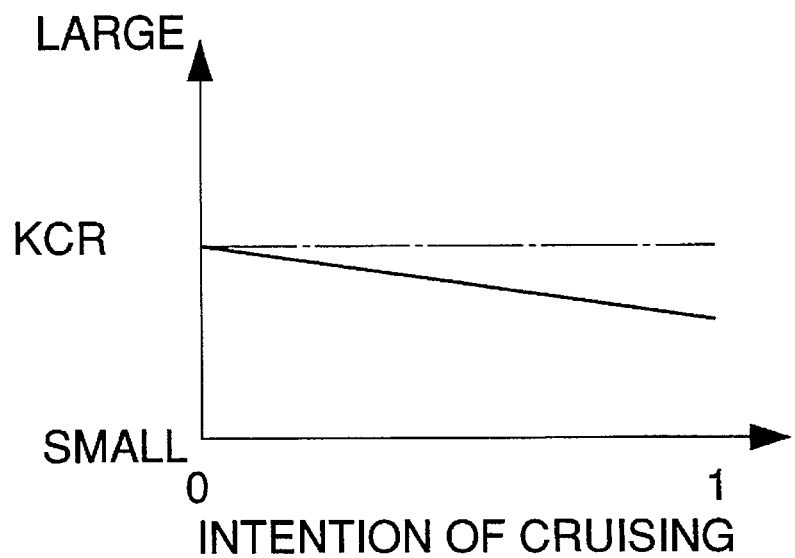
FIG. 12 shows a KCR (cruising intention-dependent correction coefficient) table.
Figure 13:
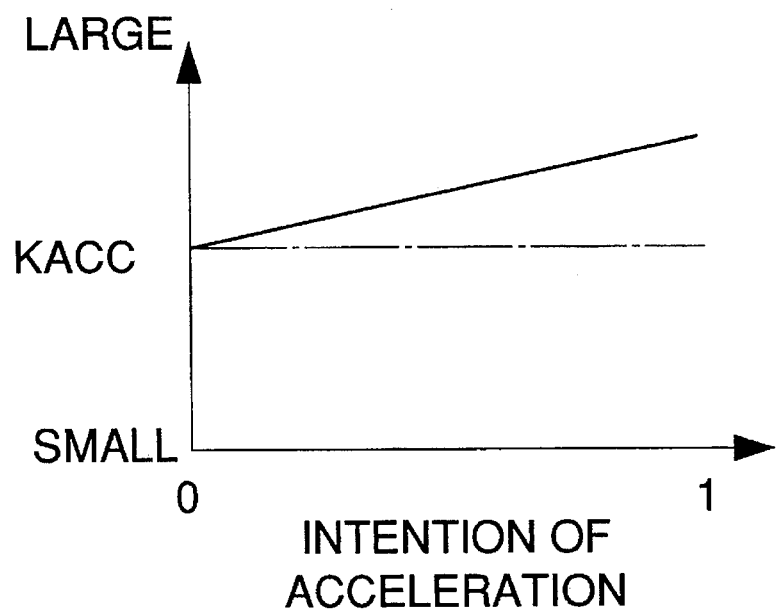
FIG. 13 shows a KACC (accelerating intention-dependent correction coefficient) table.
Figure 14:
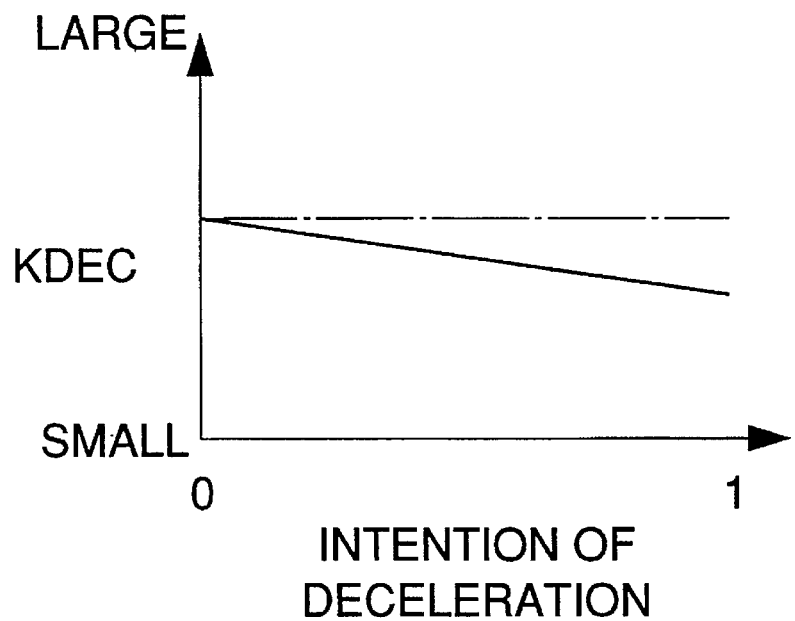
FIG. 14 shows a KDEC (decelerating intention-dependent correction coefficient) table.

The KCR table, the KACC table and the KDEC table are shown in FIG. 12, FIG. 13, and FIG. 14, respectively. The KCR table is set, as shown in FIG. 12, such that as the degree of the intention of cruising increases, the correction coefficient KCR linearly decreases. The KACC table is set, as shown in FIG. 13, such that as the degree of the intention of acceleration increases, the correction coefficient KACC linearly increases. Further, the KDEC table is set, as shown in FIG. 14, such that as the degree of the intention of deceleration increases, the correction coefficient KDEC linearly decreases.

Then, at a step S34, the traveling resistance calculated is read in, and a traveling resistance-dependent correction coefficient KREG is determined by retrieving a KREG table stored in the memory means 5c according to the traveling resistance.

Figure 15:
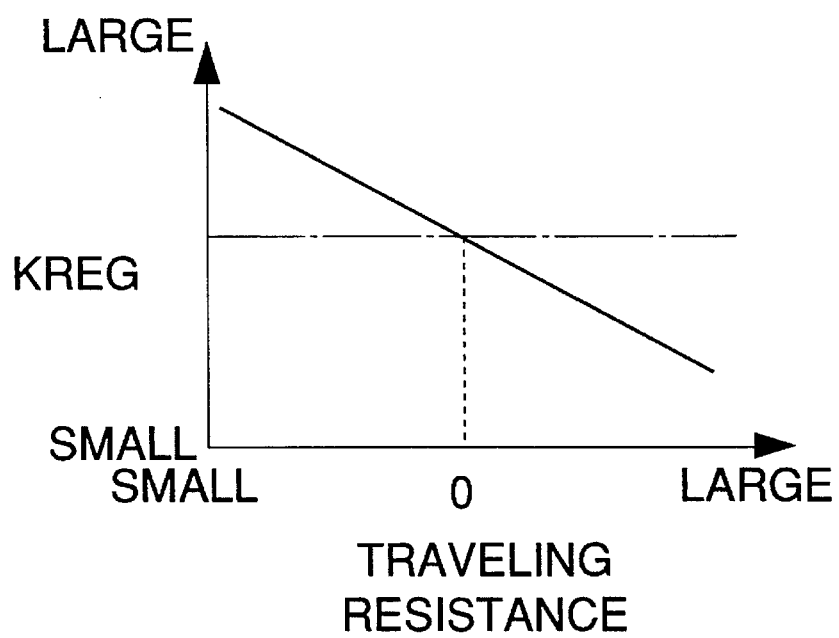
FIG. 15 shows a KREG (traveling resistance-dependent correction coefficient) table.

As shown in FIG. 15, the KREG table is set such that as the traveling resistance increases, the traveling resistance-dependent correction coefficient KREG linearly decreases.

Next, the desired rate correction coefficient KTOTAL is calculated by the use of the following equation (7) at a step S35, followed by terminating the program:

$$KTOTAL=KCR\times KACC\times KDEC\times KREG \quad (7)$$

By the use of the desired rate correction coefficient KTOTAL thus calculated, the desired combustion variation rate set according to operating conditions of the engine and the shift position is corrected in the same manner as described in the first embodiment, and the engine operation control parameters (the air-fuel ratio A/F and the ignition timing θIG) are controlled such that the actual combustion variation rate becomes equal to the corrected desired combustion variation rate. Therefore, it is possible to achieve very fine control of the combustion state of the engine according to the driver's intention and the traveling resistance in addition to the engine operating conditions and the shift position, thereby providing effects similar to those achieved in the first embodiment.

Figure 18:
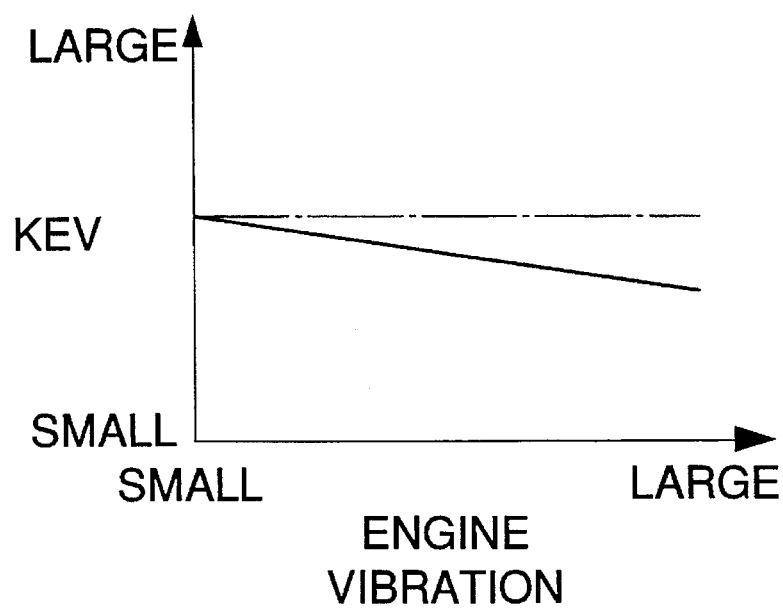
FIG. 18 shows a KEV (engine vibration-dependent correction coefficient) table.

Next, a third embodiment of the invention will be described with reference to FIG. 16 and FIG. 18.

The arrangement of a control system according to the present embodiment and the engine incorporating the same is substantially identical to the arrangement according to the first embodiment, and therefore detailed description thereof is omitted.

The present embodiment is distinguished from the first embodiment in the manner of calculation of the desired rate correction coefficient. More specifically, in the present embodiment, a variation in the vehicle speed (or an amount of engine vibration) is detected, and the desired rate correction coefficient is calculated based on the detected variation in the vehicle speed (or the detected amount of engine vibration). The desired combustion variation rate set based on the engine operating conditions and the shift position of the transmission is corrected by the desired rate correction coefficient, whereby the engine operation control parameters (the air-fuel ratio A/F, the ignition timing θIG, etc.) are controlled such that the actual combustion variation rate becomes equal to the corrected desired combustion variation rate.

The vehicle speed variation is used as a parameter indicative of the degree of vibration sensed by the driver. The vehicle speed variation becomes large at or in the vicinity of a surge limit and a lean limit of the air-fuel ratio control, when the vehicle is traveling on a smooth road, as well as it is always large when it is traveling on a rough road. The vehicle speed variation is obtained by integrating the absolute value of the difference between a value of the vehicle speed detected at the preceding time point and a value of the vehicle speed detected at the present time point, over a predetermined time period, by the use of the following equation (8):

$$\text{Vehicle Speed Variation} = \sum_{x=n-A}^{n} |\text{Vehicle Speed}(x) - \text{Vehicle Speed}(x-1)| \quad (8)$$

In the equation (8), if the sign of the value indicative of the difference between the vehicle speed detected at the preceding time point and the vehicle speed detected at the present time point is inverted less than a predetermined number of times, i.e. if the vehicle is accelerating or decelerating at a nearly fixed rate, the vehicle speed variation is set to 0.

Alternatively of the vehicle speed variation, the amount of engine vibration may be used as the parameter indicative of the degree of vibration sensed by the driver. The calculation of the engine vibration requires detecting an amount of displacement of the engine. The amount of displacement of the engine can be detected by measuring changes in the positional relationship between an engine mount, not shown, on which the engine is mounted, and the engine, or by measuring an amount of operation of an active control mount, not shown, which is also used as an engine mount but displaceable in response to engine vibration through active control.

The amount of engine vibration is calculated by integrating the absolute value of the amount of displacement of the engine over a predetermined time period by the use of the following equation (9):

$$\text{Engine Vibration} = \sum_{x=n-A}^{n} |\text{Engine Displacement}(x)| \quad (9)$$

Figure 16:
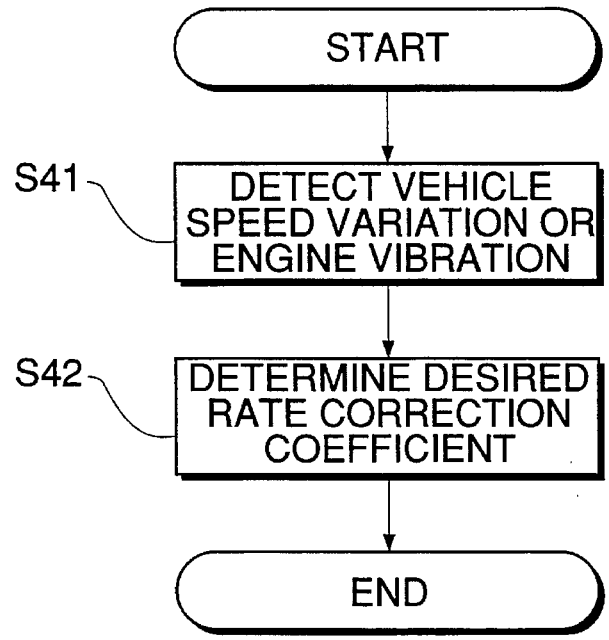
FIG. 16 is a flowchart showing a program for calculating the desired rate correction coefficient, which is executed by a control system according to a third embodiment of the invention.

Next, a manner of calculation of the desired rate correction coefficient according to the present embodiment will be described with reference to FIG. 16 showing a routine for calculating the desired rate correction coefficient.

First, at a step S41, the vehicle speed variation (or the amount of engine vibration) is calculated. Then, a vehicle speed variation-dependent correction coefficient KVV (or an engine vibration-dependent correction coefficient KEV) is determined as the desired rate correction coefficient by retrieving a KVV table (or a KEV table) stored in the memory means 5c, at a step S42, followed by terminating the present program.

Figure 17:
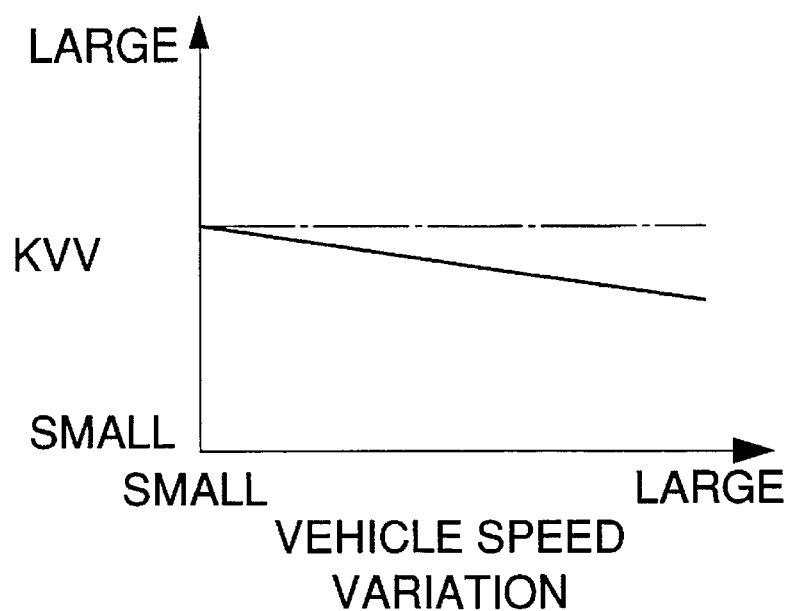
FIG. 17 shows a KVV (vehicle speed variation-dependent correction coefficient) table.

As shown in FIG. 17, the KVV table is set such that as the vehicle speed variation increases, the correction coefficient KVV linearly decreases. Similarly, the KEV table is set as shown in FIG. 18 such that as the amount of engine vibration increases, the correction coefficient KEV linearly decreases.

By the use the desired rate correction coefficient thus calculated, the desired combustion variation rate set according to the engine operating conditions and the shift position is corrected in a similar manner to that described with respect to the first embodiment, and the engine operation control parameters (the air-fuel ratio A/F, the ignition timing θIG, etc.) are controlled such that the actual combustion variation rate becomes equal to the corrected desired combustion variation rate. Therefore, it is possible to achieve very fine control of the combustion state of the engine, according to the vehicle speed variation (or the amount of engine vibration) in addition to operating conditions of the engine and the shift position of the transmission, thereby providing effects similar to those provided by the first embodiment.

What is claimed is:

1. In a control system for an internal combustion engine to which are connected a lock-up clutch and a torque converter, including combustion state-detecting means for detecting a state of combustion of said engine, combustion variation rate-calculating means for calculating a rate of combustion variation, based on said state of combustion of said engine detected by said combustion state-detecting means while said engine is in a combustive state, operating condition-detecting means for detecting operating conditions of said engine, and control parameter-adjusting means for adjusting at least one predetermined control parameter such that said rate of combustion variation calculated by said combustion variation rate-calculating means becomes equal to a desired rate of combustion variation dependent on said operating conditions of said engine detected by said operating condition-detecting means while said engine is in said combustive state, the improvement comprising:
engagement state-detecting means for detecting a state of engagement of said lock-up clutch;
slip ratio-detecting means for detecting a slip ratio of said torque converter; and
desired combustion variation rate-correcting means for correcting said desired rate of combustion variation in dependence on at least one of said state of engagement of said lock-up clutch detected by said engagement state-detecting means and said slip ratio of said torque converter detected by said slip-ratio detecting means.

2. A control system according to claim 1, wherein said desired combustion variation rate-correcting means corrects said desired rate of combustion variation to a smaller value as said state of engagement of said lock-up clutch is tighter.

3. A control system according to claim 1 or 2, wherein said desired combustion variation rate-correcting means corrects said desired rate of combustion variation to a larger value as said slip ratio of said torque is larger.

4. A control system according to claim 1, wherein said at least one predetermined control parameter comprises air-fuel ratio of a mixture supplied to said engine, and ignition timing of said engine.

5. In a control system for an internal combustion engine to which are connected a lock-up clutch and a torque converter, including combustion state-detecting means for detecting a state of combustion of said engine, combustion variation rate-calculating means for calculating a rate of combustion variation, based on said state of combustion of said engine detected by said combustion state-detecting means, operating condition-detecting means for detecting operating conditions of said engine, and control parameter-adjusting means for adjusting at least one predetermined control parameter such that said rate of combustion variation calculated by said combustion variation rate-calculating means becomes equal to a desired rate of combustion variation dependent on said operating conditions of said engine detected by said operating condition-detecting means, the improvement comprising:
engagement state-detecting means for detecting a state of engagement of said lock-up clutch;
slip ratio-detecting means for detecting a slip ratio of said torque converter; and
desired combustion variation rate-correcting means for correcting said desired rate of combustion variation in dependence on at least one of said state of engagement of said lock-up clutch detected by said engagement state-detecting means and said slip ratio of said torque converter detected by said slip-ratio detecting means,
wherein said desired combustion variation rate-correcting means corrects said desired rate of combustion variation to a smaller value as said state of engagement of said lock-up clutch is tighter.

6. A control system according to claim 5, wherein said desired combustion variation rate-correcting means corrects said desired rate of combustion variation to a larger value as said slip ratio of said torque is larger.

7. In a control system for an internal combustion engine to which are connected a lock-up clutch and a torque converter, including combustion state-detecting means for detecting a state of combustion of said engine, combustion variation rate-calculating means for calculating a rate of combustion variation, based on said state of combustion of said engine detected by said combustion state-detecting means, operating condition-detecting means for detecting operating conditions of said engine, and control parameter-adjusting means for adjusting at least one predetermined control parameter such that said rate of combustion variation calculated by said combustion variation rate-calculating means becomes equal to a desired rate of combustion variation dependent on said operating conditions of said engine detected by said operating condition-detecting means, the improvement comprising:
engagement state-detecting means for detecting a state of engagement of said lock-up clutch;
slip ratio-detecting means for detecting a slip ratio of said torque converter; and
desired combustion variation rate-correcting means for correcting said desired rate of combustion variation in dependence on at least one of said state of engagement of said lock-up clutch detected by said engagement state-detecting means and said slip ratio of said torque converter detected by said slip-ratio detecting means,
wherein said desired combustion variation rate-correcting means corrects said desired rate of combustion variation to a larger value as said slip ratio of said torque is larger.

8. In a control system for an internal combustion engine to which are connected a lock-up clutch and a torque converter, including combustion state-detecting means for detecting a state of combustion of said engine, combustion variation rate-calculating means for calculating a rate of combustion variation, based on said state of combustion of said engine detected by said combustion state-detecting means, operating condition-detecting means for detecting operating conditions of said engine, and control parameter-adjusting means for adjusting at least one predetermined control parameter such that said rate of combustion variation calculated by said combustion variation rate-calculating means becomes equal to a desired rate of combustion variation dependent on said operating conditions of said engine detected by said operating condition-detecting means, the improvement comprising:
engagement state-detecting means for detecting a state of engagement of said lock-up clutch;
slip ratio-detecting means for detecting a slip ratio of said torque converter; and
desired combustion variation rate-correcting means for correcting said desired rate of combustion variation in dependence on at least one of said state of engagement of said lock-up clutch detected by said engagement state-detecting means and said slip ratio of said torque converter detected by said slip-ratio detecting means, wherein said at least one predetermined control parameter comprises air-fuel ratio of a mixture supplied to said engine, and ignition timing of said engine.

* * * * *